Patented Mar. 11, 1952

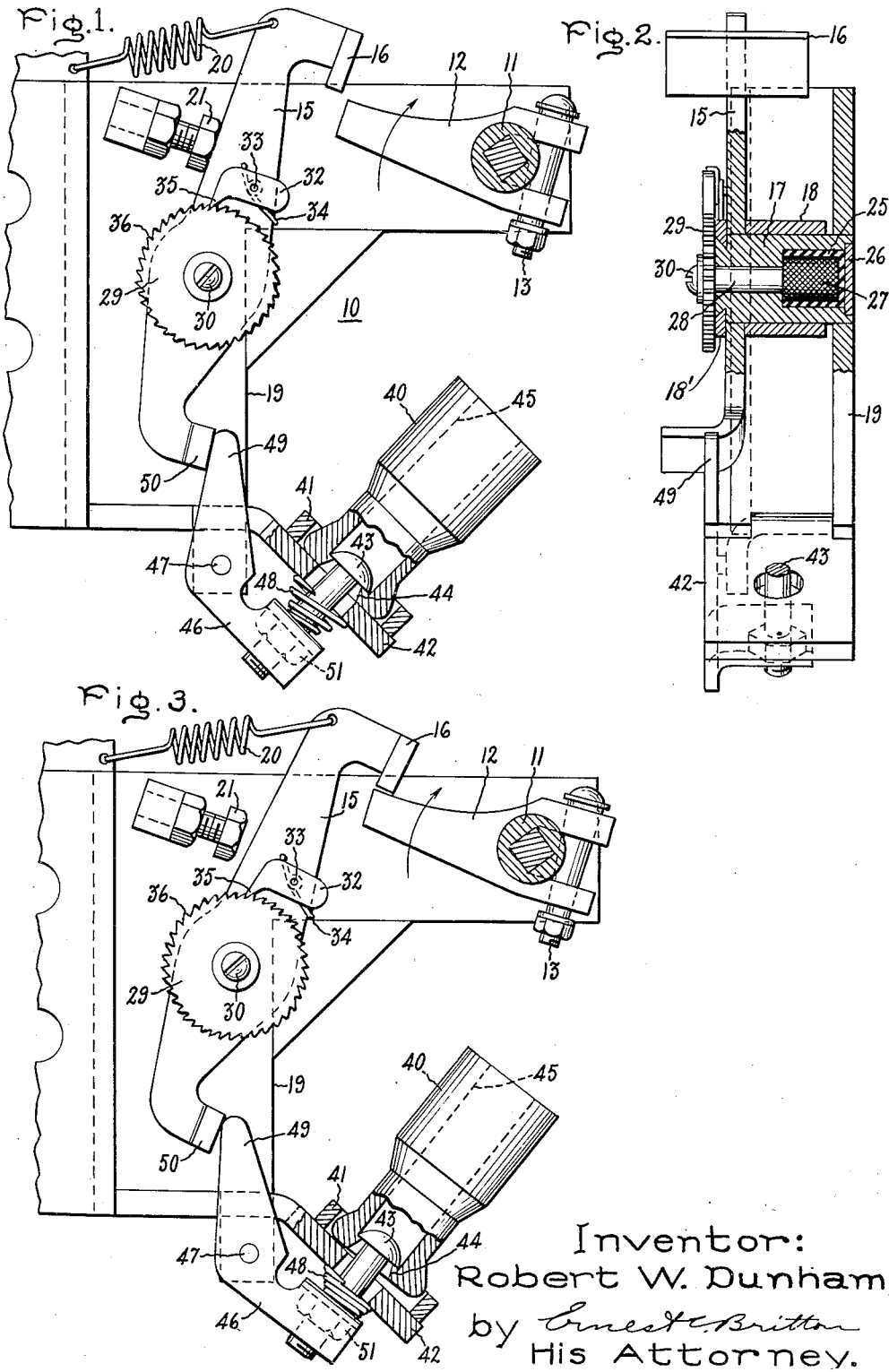

2,588,914

UNITED STATES PATENT OFFICE 2,588,914

RETARDED RELEASE SHOCK LOCK

Robert W. Dunham, Drexel Hill, Pa., assignor to General Electric Company, a corporation of New York Application July 14, 1950, Serial No. 173,821

7 Claims. (Cl. 74—527)

The invention relates to shock locks particularly of a type suitable for preventing false operation of automatic circuit breakers, relays, and the like under shock conditions, as for example on warcraft or in other service where false operation due to shock might be critical.

Various forms of shock locks have heretofore been provided but with increasing demands for greater shock resistance further improvements therein become desirable in order to meet these demands.

The principal object of the present invention to provide an improved shock responsive lock having time delay means for holding the lock in the locking position in the path of a movable element for preventing the movement thereof for an interval after the initial shock subsides to thereby increase the shock resistance, particularly against delayed or rebound vibrations.

Another object is to provide an improved viscous time delayed release locking mechanism having a one way connection for retarding only the release thereof and particularly adapted for operation to the locking position by a universal shock responsive mechanism of the inverted gyrating pendulum type such as described and claimed in Favre Patent 2,467,200, assigned to the assignee of the present invention.

Further objects and advantages of the invention will appear in the following description of the accompanying drawing in which Fig. 1 is a side view of an inverted gyrating shock responsive pendulum-operated and viscous-retarded release locking mechanism of the present invention with some of the shock responsive parts in section in order to show the construction thereof; Fig. 2 is a side view of the improved shock lock shown in Fig. 1 with some of the parts of the viscous-retarded release mechanism in section in order more clearly to show the construction details; and Fig. 3 is a front view of the improved retarded release shock lock shown in Fig. 1 with the cooperating parts in their relative positions to which they are operated in response to shock.

Referring to Fig. 1, the improved retarded release shock lock indicated generally by the reference character 10 is shown applied to prevent or block the tripping of an automatic circuit breaker mechanism of which there is shown only the rotatable trip shaft 11 that is operated by suitable automatic means and has the latch arm 12 clamped thereto by means of the bolt 13 for cooperation with the shock lock 10. However, it will be understood that the improved shock lock of the present invention is not limited in its application to such circuit breakers but may be used to prevent false operation of other devices if desired. As indicated by the arrow in the drawing, the tripping direction of the circuit breaker trip shaft 11 is clockwise.

In accordance with the present invention, the movable locking member or lever 15 is provided with the catch 16 at one end thereof for movement into the path of arm 12 to engage with the arm 12 under shock conditions so as to prevent a shock produced operation of the circuit breaker trip shaft 11 by blocking the clockwise movement thereof. As more clearly shown in Fig. 2, the locking member or lever 15 is pivotally mounted near its center on a fixed hollow cylindrical element 17 and provided with the bushing 18 and the dovetail snap ring 18' to maintain coaxial alignment therebetween. The hollow pivot element 17 is fixed to the supporting frame 19. A tension spring 20 is interconnected between the locking member 15 and an offset portion of the supporting frame 19 for biasing the locking member 15 to the released position in which it is shown in engagement with the adjustable stop 21 mounted on frame 19 to control the sensitivity.

In further accordance with the present invention, the rotary movement of the locking member 15 from the locking position to the released position is retarded by improved viscous time delay means embodied in the hollow element 17 so as to increase the resistance of the shock lock 10 particularly against rebound vibrations. For this purpose, a mass 25 of relatively high viscosity material, such as silicone putty, is provided inside of the hollow cylindrical element 17 and confined therein by the closure 26. A rotor 27 preferably knurled as shown is immersed in the mass of relatively viscous material and provided with a shaft 28 rotatable in a suitable bearing formed in element 17 and having the ratchet disk 29 fixedly secured to the outer end thereof by a suitable fastening screw 30. The locking member 15 carries a pawl 32 pivoted on pin 33 and biased by spring 34 to engage with the peripheral teeth 36 of the ratchet disk 29, thereby forming a one-way operating connection between the locking member 15 and the time delay means.

Thus when the locking member 15 is moved in the clockwise direction to carry the catch 16 into the locking position in the path of the arm 12, the pawl tooth 35 freely rides over the ratchet teeth 36. However, upon movement of the locking member 15 in the opposite direction by the bias of spring 20, the pawl 32 engages a tooth of ratchet 29 to produce simultaneous rotation of the rotor 27.

Due to the unique viscosity characteristic of the silicone mass 25, the rotation of rotor 27 can be effected only with a time delay that is somewhat selectively proportional to the rate of the applied force. Thus, the resulting retardation of the counterclockwise movement of the blocking member 15 may become greater under a severe shock condition if a force tending to suddenly supplement the bias of spring 20 results from such shock. However, due to the one-way operating connection formed by the pawl 32 and ratchet disk 29, the time delay rotor 27 is only effective for retarding movement of the locking member 15 in the releasing direction. This insures that the locking member 15 can be freely operated to its locking position and will remain substantially therein for a time interval sufficient to prevent the circuit breaker trip shaft 11 being rotated in the clockwise direction during a severe shock condition as well as during any delayed vibrations.

The improved retarded release shock lock 10 is particularly adapted for operation to the locking position by an inverted pendulum weight substantially universal shock responsive mechanism such as described and claimed in the previously noted Favre patent. Thus the inverted pendulum weight 40 is swivelly mounted for conical gyration inside the cup 41 carried on an inclined arm 42 extending from frame 19. The swivel bolt 43 has its head engaging the inwardly projecting rim 44 formed at the bottom of the axial hole 45 in the inverted pendulum member 40 so as to operatively interconnect the inverted pendulum 40 with the bell crank arm 46 that is pivotally mounted on pin 47. A compression spring 48 is interposed between the sloping arm 42 and the bell crank lever 46 so as to bias the pendulum weight 40 to the inclined position, as shown in Fig. 1, normal to the cup 41 that will produce a gyratory response to shock in substantially any direction except coincident with the axis of swivel pin 43. Spring 48 also biases the bell crank arm 46 to the position shown wherein the finger 49 is in substantially abutting engagement with or very near to the bent-over end 50 of the locking member 15 so as to form a one way operating force transmitting connection effective only to move member 15 to the locking position.

As more fully explained in the above Favre patent, the impact forces acting on the inverted pendulum weight 40 in consequence of a shock sustained in substantially any direction by the rigid frame 19 and transmitted to the inclined arm 42 causes the inverted pendulum weight 40 to move first to an off center position relative to the cup 41 and the weight 40 then rolls around the inside wall of the cup so as to gyrate about the axis of the swivel bolt 43. Such rolling or spinning action will persist until the shock vibrations subside. At the start of such gyrations of the inverted pendulum weight 40, the motion conversion effected by the swivel bolt 43 at once pulls the bell crank 46 and moves the one way operating finger 49 against the bent-over end 50 to rotate the locking member 15 to its locking position against the bias of spring 20. As previously noted, the ratchet pawl 32 rides freely over the teeth of the ratchet wheel 29 during the clockwise rotation of locking member 15 to the locking position. As soon as the gyrations of the inverted pendulum weight 40 subside, or are sufficiently reduced that the spring 48 can without moving member 15 return the weight 40 and the bell crank arm 46 to their normal positions in which they are shown in Fig. 1, the retarding action provided by the rotor 37, immersed in the high viscosity material 25, serves to retard the release of the locking arm 15 from its locking position under the bias of spring 20 for an interval after the pendulum weight 40 has returned to its normal position. This retarded release of the shock locking member 15 effectively insures that the circuit breaker trip shaft 11 remains locked against rotation in the tripping direction for a corresponding interval after the initial or substantial shock vibrations have subsided. Consequently, any continuing or rebound vibrations which may still be sufficient to effect movement of the circuit breaker trip shaft 11 in the tripping direction but insufficient to initiate or maintain gyration of the inverted pendulum weight 40 are prevented from producing false operation of the circuit breaker by the retarded release shock lock improvements of the present invention. Adjustment of the nut 51 on the swivel bolt 43 in conjunction with the adjustment of stop 21 controls the sensitivity of the shock lock 10 as well as the amount of movement required to reach the locking position.

What I claim as new and desire to secure by Letters Patent of the United States is:

1. A shock lock having in combination a movable element, a locking member mounted for movement in one direction to a locking position in the path of the movable element for preventing movement thereof, means biasing the member to move in the opposite direction to free the movable element, shock responsive means having a one-way operating force transmitting connection with the locking member for effecting movement thereof only in said one direction, and time delay means having a one-way retarding force transmitting connection with the locking member for retarding movement thereof only in said opposite direction.

2. A shock lock having in combination a movable element, a locking member pivotally mounted for rotation in one direction to a locking position in the path of the movable element for preventing movement thereof, means biasing the member to rotate in the opposite direction to free the element, shock responsive means including a movably mounted weight having a one-way operating force transmitting connection with the locking member for effecting rotation thereof only in said one direction, and a time delay means having a rotor immersed in a high viscosity material and provided with a one-way slip clutch connection with the locking member for retarding movement thereof only in said opposite direction.

3. A shock lock having in combination a movable element, a locking member mounted for movement in one direction to a locking position in the path of the movable element for preventing movement thereof, means biasing the member to move in the opposite direction to free the element, a one-way operating force transmitting element for moving the locking member only in the one direction, means including a shock responsive movable weight having substantially universal motion converting operating connections with the operating force transmitting element for effecting movement of the locking member only in said one direction in response to shock in substantially any direction, and time delay means having a one-way operating connection with the locking member for retarding movement thereof only in said opposite direction.

4. A shock lock having in combination a movable element, a locking lever pivotally mounted for rotation in one direction to a locking position in the path of the movable element for preventing movement thereof, means biasing the lever to rotate in the opposite direction to free the element, a one-way operating force transmitting element for moving the locking lever only in the one direction, means including a swivelly mounted shock responsive pendulum weight having substantially universal motion converting operating connections with the operating force transmitting element for effecting rotation of the locking lever only in said one direction in response to shock in substantially any direction, and rotary time delay means having a one-way slip clutch connection with the locking lever for retarding rotation thereof only in said opposite direction.

5. A shock lock having in combination a movable element, a locking member centrally pivoted for rotation in one direction and having a catch carried at one end thereof to a locking position in the path of the movable element to prevent movement thereof, means biasing the member to move the catch in the opposite direction to free the movable element, shock responsive means including a gyrating inverted pendulum weight having an axially movable swivel element provided with a one-way operating force transmitting connection with the other end of the locking member for effecting movement thereof only in said one direction in response to shock in substantially any direction, and time delay means having a rotor immersed in a high viscosity material and provided with a one-way ratchet connection with the locking member for retarding movement thereof only in said opposite direction.

6. A shock lock having in combination a movable element, a locking member movable to a locking position in the path of the movable element for preventing movement thereof, means including a fixed hollow cylindrical element for pivotally mounting the locking member for rotation in one direction to the locking position, means biasing the member to rotate in the opposite direction to free the movable element, shock responsive means having a one-way operating force transmitting connection with the locking member for effecting movement thereof only in said one direction and time delay means including a mass of relatively high viscosity material inside the hollow cylindrical element and a rotor immersed in the mass and provided with a one-way slip clutch connection with the locking member for retarding movement thereof only in said opposite direction.

7. A shock lock having in combination a movable element, a locking member movable to a locking position in the path of the movable element for preventing movement thereof, means including a fixed hollow cylindrical element for pivotally mounting the locking member for rotation in one direction to the locking position, means biasing the member to rotate in the opposite direction to free the movable element, a one-way operating force transmitting element for moving the locking member only in the one direction, means including an inverted gyrating pendulum weight having substantially universal motion converting operation connections with the operating force transmitting element for effecting movement of the locking member only in said one direction in response to shock in substantially any direction, and time delay means including a mass of relatively high viscosity material inside the hollow cylindrical element and a rotor immersed in the mass and provided with a one-way slip clutch connection with the lock member for retarding movement thereof only in said opposite direction.

ROBERT W. DUNHAM.

REFERENCES CITED

The following references are of record in the file of this patent:

UNITED STATES PATENTS

| Number | Name | Date |
| --- | --- | --- |
| 1,114,691 | Herz | Oct. 20, 1914 |
| 1,238,910 | Henderson | Sept. 4, 1917 |
| 1,317,396 | Sanders | Sept. 30, 1919 |
| 1,851,739 | Townsend | Mar. 29, 1932 |
| 2,460,116 | Bazley | Jan. 25, 1949 |
| 2,464,516 | Kenyon | Mar. 15, 1949 |
| 2,467,200 | Favre | Apr. 12, 1949 |
| 2,491,657 | Graves | Dec. 20, 1949 |
| 2,507,182 | Young | May 9, 1950 |

OTHER REFERENCES

Spooner Product Engineering, pp. 90–93, January 1950.